United States Patent
Kapaan et al.

(10) Patent No.: US 6,848,557 B2
(45) Date of Patent: Feb. 1, 2005

(54) CLUTCH ACTUATOR UNIT

(75) Inventors: Hendrikus Jan Kapaan, Nieuwegein (NL); Jacobus Zwarts, Nieuwegein (NL); Bernardus Gerardus Van Leeuwen, Nieuwegein (NL); Nicolaas Kollaard, Montfoort (NL); Alexander Molenaar, Weesp (NL); Frédéric Ponson, Luynes (FR)

(73) Assignee: SKF Engineering and Research Centre B.V., Nieuwegein (NL)

( * ) Notice: Subject to any disclaimer, the term of this patent is extended or adjusted under 35 U.S.C. 154(b) by 0 days.

(21) Appl. No.: 10/276,144
(22) PCT Filed: May 18, 2001
(86) PCT No.: PCT/NL01/00379
§ 371 (c)(1), (2), (4) Date: Dec. 11, 2002
(87) PCT Pub. No.: WO01/88402
PCT Pub. Date: Nov. 22, 2001

(65) Prior Publication Data
US 2004/0020741 A1 Feb. 5, 2004

(30) Foreign Application Priority Data
May 18, 2000 (NL) .............................................. 1015234

(51) Int. Cl.$^7$ ........................... F16D 27/00; F16H 25/22
(52) U.S. Cl. ...................... 192/84.6; 192/94; 74/424.81
(58) Field of Search ................. 192/84.6, 94; 74/89.15, 74/424.71, 424.81

(56) References Cited

U.S. PATENT DOCUMENTS

| 4,766,985 A | * | 8/1988 | Brusasco .................... 192/84.6 |
| 4,865,173 A |   | 9/1989 | Leigh-Monstevens et al. |
| 5,002,166 A | * | 3/1991 | Leigh-Monstevens et al. ... 477/83 |
| 5,267,635 A | * | 12/1993 | Peterson et al. ............... 192/90 |
| 5,415,489 A | * | 5/1995 | Hutchins et al. .............. 403/76 |
| 5,984,068 A | * | 11/1999 | Reed, Jr. .................... 192/84.6 |

FOREIGN PATENT DOCUMENTS

EP 0 636 819 A1 2/1995

* cited by examiner

Primary Examiner—Richard M. Lorence
(74) Attorney, Agent, or Firm—Oliff & Berridge, PLC

(57) ABSTRACT

A clutch actuator unit comprises a housing (8, 9), a screw mechanism and an actuator head which at one end engages the screw mechanism (1, 2) and at the other end has an actuating end (18), which actuator head (16) can be displaced in axial direction by the screw mechanism upon driving the screw mechanism. The actuating end (18) of the actuator head (16) is displaceable in transverse direction with respect to the screw mechanism as well.

19 Claims, 2 Drawing Sheets

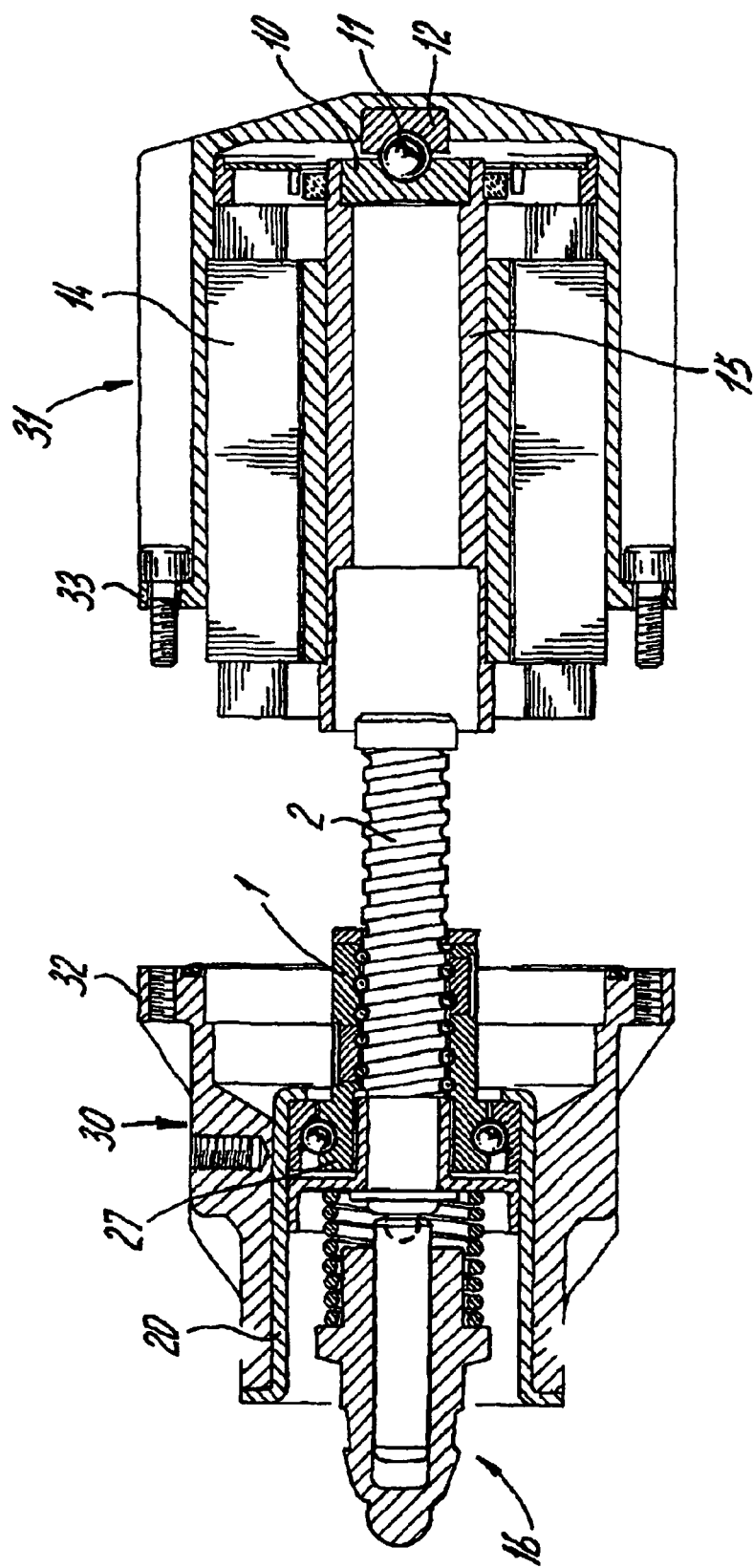

CLUTCH ACTUATOR UNIT

The invention is related to an actuator for a clutch. Such clutch actuator unit provides a displacement of the lever against the biasing force of the diaphragm spring of a plate clutch.

The actuator units are generally of a hydraulic type. They are able to actuate the end of the clutch lever, which end carries out an arch-shaped trajectory.

The object of the invention is to provide an actuator unit of this type which is of a mechanical nature, so as to i.a. avoid the use of hydraulic fluids. This object is achieved by means of a clutch actuator unit comprising a housing, a screw mechanism and an actuator head which at one end engages the screw mechanism and at the other end has an actuating end, which actuator head can be displaced in axial direction by the screw mechanism upon driving the screw mechanism, the actuating end of the actuator head being displaceable in transverse direction with respect to the screw mechanism as well.

The clutch actuator unit according to the invention can be driven by any suitable motor, in particular by means of an electric motor. In that case, a clutch-by-wire system can be applied, wherein electrical wires are used instead of hydraulic lines.

The transverse moveability of the actuator head can be obtained by means of a swivel.

In one of the embodiments (the so-called "push" version), the actuator head engages the screw of the screw mechanism, said screw being supported by a linear guide. The linear guide protects the screw against the lateral forces which result in the tilted positions of the swivel.

This lateral support can be obtained in an embodiment wherein the screw and the actuator head are at least partly accommodated within a tube-like guiding means or cylinder, a support piston being provided which is connected to the screw and which is slidably supported within said cylinder.

A very stable support of the clutch forces is obtained in case the actuator head comprises at least two telescopic parts, one of which engages the screw mechanism, and the other of which carries the actuating end, biasing means being provided for biasing said telescopic parts away from each other.

Furthermore, the actuator head has one telescopic part which is constantly urged outwardly. Such constant bias is advantageous in that thereby the clutch lever is held under a constant preload, and also the bearing which is positioned between said clutch lever and the diaphragm spring. As a result, the occurrence of undesirable noises associated with a loosely held bearing are avoided.

Preferably, one of the telescopic parts is a pin, and the other of the telescopic parts comprises a sleeve having a bore in which the pin is slidingly accommodated, a biasing spring being provided which engages both the pin and the sleeve. Said spring rests against the support piston and against an outwardly extending flange of the sleeve, said flange fitting with play within the bore so as to allow transverse movement of the actuator head.

The cylinder, at its end facing away from the actuator head, has an inwardly protruding flange supporting a bearing which carries the rotatable nut of the screw mechanism.

The clutch actuator unit according to the invention can be carried out for exerting a pushing and/or a pulling force on the object to be actuated. In the case of a "pulling" embodiment, for instance a cable connection may be applied between the screw mechanism and the actuator arm.

Furthermore, the housing may be mounted in such a way that it can swivel so as to additionally allow the screw mechanism to follow object movements.

The spring for preloading the unit may also be applied externally.

The invention will now be described further with reference to the "push version" embodiment shown in the drawings.

FIG. 3 shows the modular layout of the embodiment according to FIGS. 1 and 2.

Figure 1:
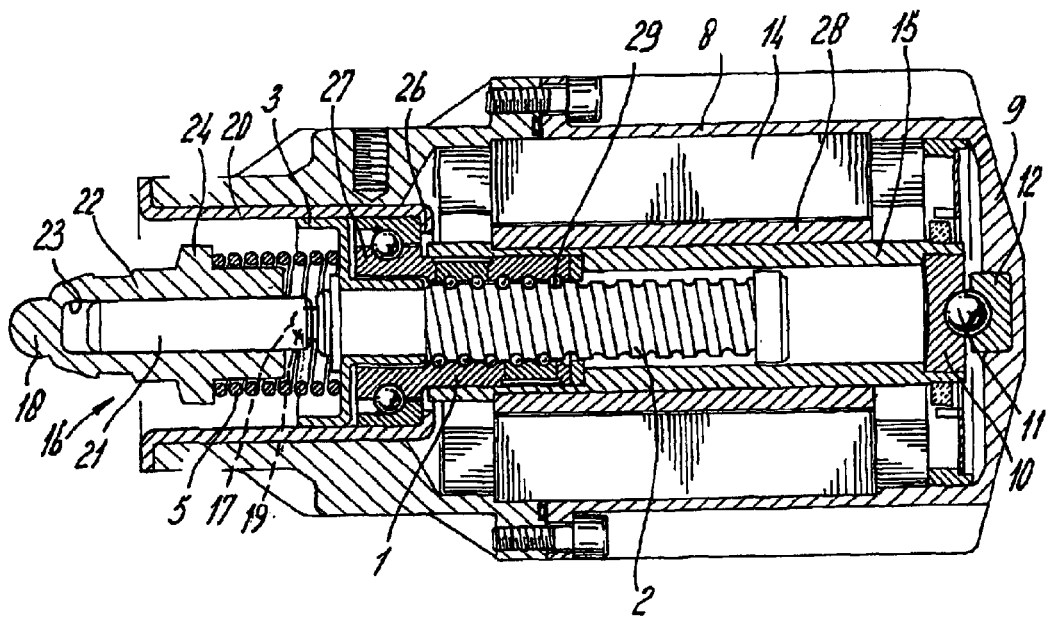
FIG. 1 shows a cross section through a first embodiment, of clutch actuator unit according to the invention, in retracted position.
Figure 2:
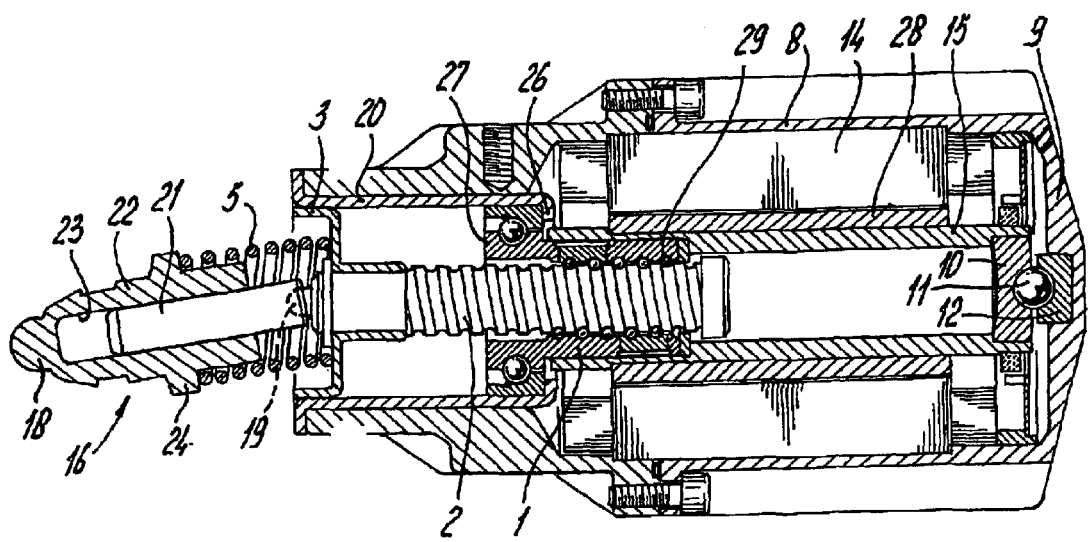
FIG. 2 shows the embodiment according to FIG. 1 in extended and swivelled position.

The clutch actuator unit according to the invention as shown in the FIGS. 1–3 comprises a nut 1 and a screw 2 which have screw threads which engage each other by means of balls 29. The nut 1 is rotatably supported by means of the angular contact ball bearing 27, the inner ring of which is integrated with the nut 1.

The outer ring of the bearing 27 is accommodated in a cylinder 20, and rests against the inwardly pointing flange 26 thereof.

The cylinder 20 itself is accommodated in the housing 8, 9 of the clutch actuator unit.

The housing contains an electric motor 14, the rotor 28 of which is connected to a sleeve. This sleeve is at one end connected to the nut 1, and at the other end is supported by means of the ball swivel 10, 11, 12 which rests against the housing cover 9.

The screw 2 is held against rotation, and engages an actuator head 16 which by means of a swivel end 17 engages the swivel support 19 which is carried out as a ball. This swivel support 19 is connected to the screw 2.

The actuator head 16 also has an actuating end 18, which for instance can be connected to the clutch lever.

The actuator head 16 (which may consist of plastic) comprises two telescopic parts, carried out as a sleeve 22 in the bore 23 of which the pin 21 is accommodated. The sleeve 22 has an outwardly extending flange 24, a compression spring acting between the flange 24 and the bottom of a guidance piston 3. The guidance piston 3 is slideably accommodated within the cylinder 20. This sliding piston 3 is connected to the screw 2, and supports this screw against any lateral forces which may be exerted on the swivel support 19 thereof when the actuator head 16 is swivelled out of its aligned position.

As shown in FIG. 2, the actuator head 16 may swivel from its aligned position to an oblique position, e.g. so as to follow the curved movement of the arch-shaped movement of the clutch lever end.

Moreover, the sleeve type telescopic part 22 has been driven to the outside under the influence of the compression spring 5. As a result of the pressing force provided by this compression spring 5, the actuating end 18 of the actuator head 16 is constantly urged against the clutch lever, thus providing a preload on the bearing which usually is available between the clutch lever and the diaphragm spring.

FIG. 3 shows that the clutch actuator unit has a modular layout. The screw mechanism 2, 1 and the actuator head 16 together with the angular contact ball bearing 27 are accommodated within the module 30. The remaining components, that is the motor 14, the support bearing 10–12, and the sleeve 15 are accommodated within the other module 31. By means of the flanges 32, 33 these modules 30, 31 can be attached to each other.

At least one of the components of the clutch actuator 4 may be manufactured by means of powder metallurgy. Also, a hard whirling operation may be applied for manufacturing the actuator components.

What is claimed is:

1. Clutch actuator unit, comprising a housing, a screw mechanism and an actuator head which at one end engages the screw mechanism and at the other end has an actuating end, which actuator head can be displaced in axial direction by the screw mechanism upon driving the screw mechanism, the actuating end of the actuator head being displaceable in transverse direction with respect to the screw mechanism as well.

2. Clutch actuator unit according to claim 1, wherein the actuator head engages the screw mechanism through a swivel.

3. Clutch actuator unit according to claim 1, wherein the actuator head engages a screw of the screw mechanism, said screw being supported by a linear guide.

4. Clutch actuator unit according to claim 3, wherein the screw and the actuator head are at least partly accommodated within a tube-like guiding means or cylinder, wherein the linear guide a support piston which is connected to the screw and which is slidably supported within said cylinder.

5. Clutch actuator unit according to claim 1, wherein the actuator head comprises at least two telescopic parts, one of which engages the screw mechanism, and the other of which carries the actuating end, biasing means being provided for biasing said telescopic parts away from each other.

6. Clutch actuator unit according to claim 5, wherein one of the telescopic parts is a pin, and the other of the telescopic parts comprises a sleeve having a bore in which the pin is slidingly accommodated, wherein the biasing means includes a biasing spring which engages both the pin and the sleeve.

7. Clutch actuator unit according to claim 6, wherein the biasing spring rests against the support piston and against an outwardly extending flange of the sleeve, said flange fitting with play within the bore so as to allow transverse movement of the actuator head.

8. Clutch actuator unit according to claim 7, wherein the cylinder comprises an abutment for limiting a maximum mutual stroke of the telescopic parts.

9. Clutch actuator according to claim 5, wherein one telescopic part engages a screw of the screw mechanism through a push/pull swivel connection.

10. Clutch actuator unit according to claim 4, wherein the cylinder, at its end facing away from the actuator head, has an inwardly protruding flange supporting a bearing which carries a rotatable nut of the screw mechanism.

11. Clutch actuator unit according to claim 1, further comprising a support bearing associated with the screw mechanism, wherein the support bearing is a ball bearing.

12. Clutch actuator unit according to claim 1, wherein the screw mechanism comprises a ball screw with a lead angle providing back driveability.

13. Clutch actuator unit according claim 1, wherein the screw mechanism comprises a roller screw.

14. Clutch actuator unit according to claim 1, wherein the screw mechanism is driveable through an electric motor.

15. Clutch actuator unit according to claim 1, wherein a rotor of a motor is connected to a nut of the screw mechanism.

16. Clutch actuator unit according to claim 1, wherein an end of a rotor which is facing away from the actuator head is supported with respect to the housing by means of a pivot or bearing.

17. Clutch actuator unit according to claim 16, wherein the spring is located between the screw and the pivot or bearing.

18. Clutch actuator unit according to claim 1, wherein a through-going bore is provided, which extends through the screw mechanism, the housing and possibly the actuator head.

19. Clutch actuator unit according to claim 11, wherein the ball bearing is a deep groove ball bearing or an angular contact ball bearing.

* * * * *